United States Patent
Gilquin

(10) Patent No.: US 9,972,066 B1
(45) Date of Patent: *May 15, 2018

(54) SYSTEMS AND METHODS FOR PROVIDING VARIABLE IMAGE PROJECTION FOR SPHERICAL VISUAL CONTENT

(71) Applicant: GOPRO, INC., San Mateo, CA (US)

(72) Inventor: Yann Gilquin, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 15/072,238

(22) Filed: Mar. 16, 2016

(51) Int. Cl.
  *G06K 9/32* (2006.01)
  *G06T 3/00* (2006.01)

(52) U.S. Cl.
  CPC .................. *G06T 3/0031* (2013.01)

(58) Field of Classification Search
  CPC ..................................................... G06T 3/0031
  See application file for complete search history.

(56) References Cited

U.S. PATENT DOCUMENTS

| | | |
|---|---|---|
| 6,633,685 B1 | 10/2003 | Kusama |
| 7,222,356 B1 | 5/2007 | Yonezawa |
| 7,483,618 B1 | 1/2009 | Edwards |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |
| 8,611,422 B1 | 12/2013 | Yagnik |
| 8,612,463 B2 | 12/2013 | Brdiczka |
| 8,718,447 B2 | 5/2014 | Yang |
| 8,763,023 B1 | 6/2014 | Goetz |
| 8,774,560 B2 | 7/2014 | Sugaya |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

PCT International Search Report and Written Opinion for PCT/US2015/023680, dated Oct. 6, 2015, 13 pages.

(Continued)

*Primary Examiner* — Gregory M Desire
(74) *Attorney, Agent, or Firm* — Sheppard Mullin Richter & Hampton LLP

(57) ABSTRACT

Variable image projection for spherical visual content may be provided by obtaining visual information defining an image of the spherical visual content and a field of view for the spherical visual content. A location of a projection point may be determined based on the field of view. A two-dimensional projection of the spherical visual content may be determined by projecting pixels of the image within the field of view to the two-dimensional projection plane. Individuals pixels of the image may be projected along individual projection lines including the projection point and the individual pixel. Presentation of the two-dimensional projection of the spherical visual content may be effectuated.

20 Claims, 6 Drawing Sheets

(56) References Cited

U.S. PATENT DOCUMENTS

| | | | |
|---|---|---|---|
| 8,817,044 B2* | 8/2014 | Swart | H04N 9/3182 |
| | | | 345/619 |
| 8,971,623 B2 | 3/2015 | Gatt | |
| 8,990,328 B1 | 3/2015 | Grigsby | |
| 9,041,727 B2 | 5/2015 | Ubillos | |
| 9,077,956 B1 | 7/2015 | Morgan | |
| 9,142,257 B2 | 9/2015 | Woodman | |
| 9,253,533 B1 | 2/2016 | Morgan | |
| 9,277,122 B1* | 3/2016 | Imura | G06T 7/73 |
| 9,342,376 B2 | 5/2016 | Jain | |
| 9,396,385 B2 | 7/2016 | Bentley | |
| 9,404,764 B2* | 8/2016 | Lynch | G01C 21/3638 |
| 9,418,283 B1 | 8/2016 | Natarajan | |
| 9,602,795 B1* | 3/2017 | Matias | G11B 27/34 |
| 2002/0165721 A1 | 11/2002 | Chang | |
| 2004/0001706 A1 | 1/2004 | Jung | |
| 2004/0128317 A1 | 7/2004 | Sull | |
| 2005/0025454 A1 | 2/2005 | Nakamura | |
| 2005/0108031 A1 | 5/2005 | Grosvenor | |
| 2005/0198018 A1 | 9/2005 | Shibata | |
| 2006/0080286 A1 | 4/2006 | Svendsen | |
| 2006/0115108 A1 | 6/2006 | Rodriguez | |
| 2007/0204310 A1 | 8/2007 | Hua | |
| 2007/0230461 A1 | 10/2007 | Singh | |
| 2008/0044155 A1 | 2/2008 | Kuspa | |
| 2008/0123976 A1 | 5/2008 | Coombs | |
| 2008/0152297 A1 | 6/2008 | Ubillos | |
| 2008/0163283 A1 | 7/2008 | Tan | |
| 2008/0177706 A1 | 7/2008 | Yuen | |
| 2008/0183843 A1 | 7/2008 | Gavin | |
| 2008/0253735 A1 | 10/2008 | Kuspa | |
| 2008/0313541 A1 | 12/2008 | Shafton | |
| 2009/0019995 A1 | 1/2009 | Miyajima | |
| 2009/0125559 A1 | 5/2009 | Yoshino | |
| 2009/0213270 A1 | 8/2009 | Ismert | |
| 2009/0252474 A1 | 10/2009 | Nashida | |
| 2010/0046842 A1 | 2/2010 | Conwell | |
| 2010/0086216 A1 | 4/2010 | Lee | |
| 2010/0104261 A1 | 4/2010 | Liu | |
| 2010/0183280 A1 | 7/2010 | Beauregard | |
| 2010/0199182 A1 | 8/2010 | Lanza | |
| 2010/0231730 A1 | 9/2010 | Ichikawa | |
| 2010/0245626 A1 | 9/2010 | Woycechowsky | |
| 2010/0251295 A1 | 9/2010 | Amento | |
| 2010/0274714 A1 | 10/2010 | Sims | |
| 2010/0278504 A1 | 11/2010 | Lyons | |
| 2010/0278509 A1 | 11/2010 | Nagano | |
| 2010/0281375 A1 | 11/2010 | Pendergast | |
| 2010/0281386 A1 | 11/2010 | Lyons | |
| 2010/0318660 A1 | 12/2010 | Balsubramanian | |
| 2011/0075990 A1 | 3/2011 | Eyer | |
| 2011/0093798 A1 | 4/2011 | Shahraray | |
| 2011/0103700 A1 | 5/2011 | Haseyama | |
| 2011/0137156 A1 | 6/2011 | Razzaque | |
| 2011/0170086 A1 | 7/2011 | Oouchida | |
| 2011/0206351 A1 | 8/2011 | Givoly | |
| 2011/0242098 A1 | 10/2011 | Tamaru | |
| 2011/0293250 A1 | 12/2011 | Deever | |
| 2012/0014673 A1 | 1/2012 | O'Dwyer | |
| 2012/0017147 A1* | 1/2012 | Mark | G06F 1/1639 |
| | | | 715/702 |
| 2012/0027381 A1 | 2/2012 | Kataoka | |
| 2012/0030029 A1 | 2/2012 | Flinn | |
| 2012/0057852 A1 | 3/2012 | Devleeschouwer | |
| 2012/0123780 A1 | 5/2012 | Gao | |
| 2012/0141019 A1 | 6/2012 | Zhang | |
| 2012/0210205 A1 | 8/2012 | Sherwood | |
| 2012/0246114 A1 | 9/2012 | Edmiston | |
| 2012/0283574 A1 | 11/2012 | Park | |
| 2012/0311448 A1 | 12/2012 | Achour | |
| 2013/0136193 A1 | 5/2013 | Hwang | |
| 2013/0151970 A1 | 6/2013 | Achour | |
| 2013/0166303 A1 | 6/2013 | Chang | |
| 2013/0182166 A1 | 7/2013 | Shimokawa | |
| 2013/0195429 A1 | 8/2013 | Fay | |
| 2013/0197967 A1 | 8/2013 | Pinto | |
| 2013/0208942 A1 | 8/2013 | Davis | |
| 2013/0235071 A1 | 9/2013 | Ubillos | |
| 2013/0239051 A1 | 9/2013 | Albouze | |
| 2013/0259390 A1 | 10/2013 | Dunlop | |
| 2013/0259399 A1 | 10/2013 | Ho | |
| 2013/0282747 A1 | 10/2013 | Cheng | |
| 2013/0283301 A1 | 10/2013 | Avedissian | |
| 2013/0287214 A1 | 10/2013 | Resch | |
| 2013/0300939 A1 | 11/2013 | Chou | |
| 2013/0318443 A1 | 11/2013 | Bachman | |
| 2013/0330019 A1 | 12/2013 | Kim | |
| 2013/0343727 A1 | 12/2013 | Rav-Acha | |
| 2014/0072285 A1 | 3/2014 | Shynar | |
| 2014/0093164 A1 | 4/2014 | Noorkami | |
| 2014/0096002 A1 | 4/2014 | Dey | |
| 2014/0105573 A1 | 4/2014 | Hanckmann | |
| 2014/0149865 A1 | 5/2014 | Tanaka | |
| 2014/0152762 A1 | 6/2014 | Ukil | |
| 2014/0161351 A1 | 6/2014 | Yagnik | |
| 2014/0165119 A1 | 6/2014 | Liu | |
| 2014/0169766 A1 | 6/2014 | Yu | |
| 2014/0212107 A1 | 7/2014 | Saint-Jean | |
| 2014/0219634 A1 | 8/2014 | McIntosh | |
| 2014/0226953 A1 | 8/2014 | Hou | |
| 2014/0232818 A1 | 8/2014 | Carr | |
| 2014/0245336 A1 | 8/2014 | Lewis, II | |
| 2014/0282661 A1 | 9/2014 | Martin | |
| 2014/0300644 A1 | 10/2014 | Gillard | |
| 2014/0328570 A1 | 11/2014 | Cheng | |
| 2014/0334796 A1 | 11/2014 | Galant | |
| 2014/0341528 A1 | 11/2014 | Mahate | |
| 2014/0366052 A1 | 12/2014 | Ives | |
| 2015/0015680 A1 | 1/2015 | Wang | |
| 2015/0022355 A1 | 1/2015 | Pham | |
| 2015/0029089 A1 | 1/2015 | Kim | |
| 2015/0039646 A1 | 2/2015 | Sharifi | |
| 2015/0067811 A1 | 3/2015 | Agnew | |
| 2015/0071547 A1 | 3/2015 | Keating | |
| 2015/0113009 A1 | 4/2015 | Zhou | |
| 2015/0156247 A1 | 6/2015 | Hensel | |
| 2015/0186073 A1 | 7/2015 | Pacurariu | |
| 2015/0287167 A1* | 10/2015 | Cerny | G06T 17/10 |
| | | | 345/423 |
| 2015/0287435 A1 | 10/2015 | Land | |
| 2015/0318020 A1 | 11/2015 | Pribula | |
| 2015/0373281 A1 | 12/2015 | White | |
| 2015/0375117 A1 | 12/2015 | Thompson | |
| 2015/0382083 A1 | 12/2015 | Chen | |
| 2016/0005440 A1 | 1/2016 | Gower | |
| 2016/0026874 A1 | 1/2016 | Hodulik | |
| 2016/0027470 A1 | 1/2016 | Newman | |
| 2016/0027475 A1 | 1/2016 | Hodulik | |
| 2016/0029105 A1 | 1/2016 | Newman | |
| 2016/0055885 A1 | 2/2016 | Hodulik | |
| 2016/0094601 A1 | 3/2016 | Besehanic | |
| 2016/0103830 A1 | 4/2016 | Cheong | |
| 2016/0189752 A1 | 6/2016 | Galant | |
| 2016/0225405 A1 | 8/2016 | Matias | |
| 2016/0225410 A1 | 8/2016 | Lee | |
| 2016/0234345 A1 | 8/2016 | Roberts | |
| 2016/0260000 A1 | 9/2016 | Yamakawa | |
| 2016/0286235 A1 | 9/2016 | Yamamoto | |
| 2016/0292881 A1 | 10/2016 | Bose | |
| 2016/0358603 A1 | 12/2016 | Azam | |
| 2016/0366330 A1 | 12/2016 | Boliek | |
| 2017/0024851 A1* | 1/2017 | Baran | G06T 3/0018 |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |

(56) References Cited

FOREIGN PATENT DOCUMENTS

| WO | 2012057623 | | 5/2012 |
|---|---|---|---|
| WO | 2012057623 | A1 | 5/2012 |
| WO | 2012086120 | A1 | 6/2012 |

OTHER PUBLICATIONS

Ernoult, Emeric, "How to Triple Your YouTube Video Views with Facebook", SocialMediaExaminer.com, Nov. 26, 2012, 16 pages.
PCT International Preliminary Report on Patentability for PCT/US2015/023680, dated Oct. 4, 2016, 10 pages.
PCT International Search Report for PCT/US15/23680 dated Aug. 3, 2015, 4 pages.
PCT International Search Report for PCT/US15/41624 dated Nov. 4, 2015, 5 pages.
PCT International Written Opinion for PCT/US2015/041624, dated Dec. 17, 2015, 7 pages.
PCT International Search Report and Written Opinion for PCT/US15/12086 dated Mar. 17, 2016, 20 pages.
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al. Deep Compression: Compressing Deep Neural Networks with Pruning, Trained Quantization and Huffman Coding, International Conference on Learning Representations 2016, 14 pgs.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Yang et al., "Unsupervised Extraction of Video Highlights Via Robust Recurrent Auto-encoders" arXiv:1510.01442v1 [cs.CV] Oct. 6, 2015 (9 pgs).
Tran et al., "Learning Spatiotemporal Features with 3D Convolutional Networks", arXiv:1412.0767 [cs.CV] Dec. 2, 2014 (9 pgs).
FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.
FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf decoding.html>.
Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
Japanese Office Action for JP Application No. 2013-140131, dated Aug. 5, 2014, 6 pages.
Office Action for U.S. Appl. No. 13/831,124, dated Mar. 19, 2015, 14 pages.
PSonar URL: http://www.psonar.com/about retrieved on Aug. 24, 2016, 3 pages.

\* cited by examiner

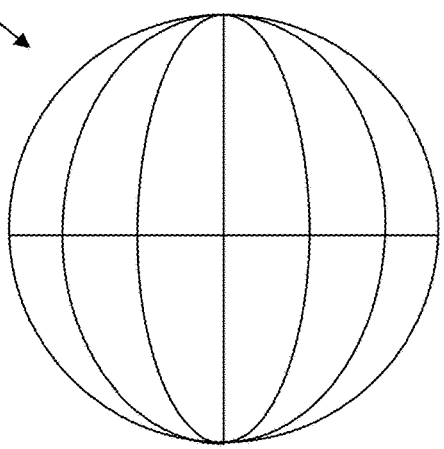
FIG. 3
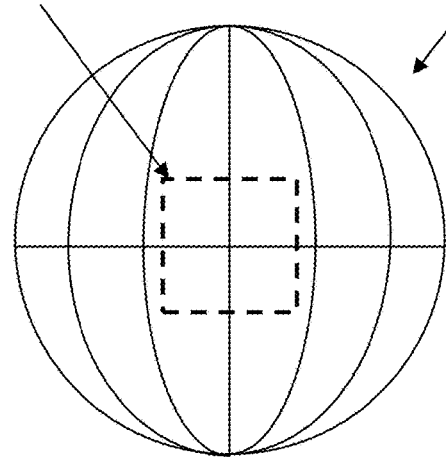 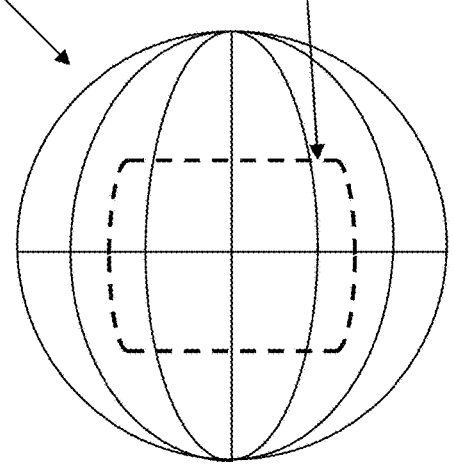
FIG. 4A  FIG. 4B

SYSTEMS AND METHODS FOR PROVIDING VARIABLE IMAGE PROJECTION FOR SPHERICAL VISUAL CONTENT

FIELD

This disclosure relates to systems and methods that provide variable image projection for spherical visual content.

BACKGROUND

Image/video applications may allow a user to choose a particular image projection to view spherical images/videos. Image/video applications do not allow a user to intuitively transition between different image projections when viewing spherical images/videos.

SUMMARY

This disclosure relates to providing variable image projection for spherical visual content. Variable image projection for spherical visual content may be provided by obtaining visual information defining an image of the spherical visual content and a field of view for the spherical visual content. A location of a projection point may be determined based on the field of view. A two-dimensional projection of the spherical visual content may be determined by projecting pixels of the image within the field of view to a two-dimensional projection plane. Individuals pixels of the image may be projected along individual projection lines including the projection point and the individual pixel. Presentation of the two-dimensional projection of the spherical visual content may be effectuated.

A system that provides variable image projection for spherical visual content may include one or more physical processors, and/or other components. The one or more physical processors may be configured by machine-readable instructions. Executing the machine-readable instructions may cause the one or more physical processors to facilitate providing variable image projection for spherical visual content. The machine-readable instructions may include one or more computer program components. The computer program components may include one or more of a visual information component, a field of view component, a projection point component, a projection component, a display component, and/or other computer program components.

The visual information component may be configured to obtain visual information defining an image of spherical visual content. Spherical visual content may include visual content obtained by a spherical capture. Visual content may refer to media content that may be observed visually. Visual content may include one or more of an image, a sequence of images, a frame of a video, a video, and/or other visual content. A spherical capture may include 360 degrees or less than 360 degrees capture of visual content at a location. An image of spherical visual content may include an array of pixels.

The field of view component may be configured to obtain a field of view for the spherical visual content. The field of view may define an extent of the image to be displayed. In some implementations, the field of view component may be configured to determine a new field of view for the spherical visual content.

The projection point component may be configured to determine a location of a projection point based on the field of view. In some implementations, the projection point may be located on a radius line between a center of the spherical visual content and a pole of the spherical visual content opposite a two-dimensional projection plane. In some implementations, the projection point component may be configured to determine a new location of the projection point based on a new field of view.

In some implementations, the projection point may be located in the center of the spherical visual content based on the field of view being less than or equal to 90 degrees. In some implementations, the two-dimensional projection of the spherical visual content may include a gnomonic projection, and/or other projections.

In some implementations, the projection point may be located in the pole of the spherical visual content opposite the two-dimensional projection plane based on the field of view being greater than or equal to 180 degrees. In some implementations, the two-dimensional projection of the spherical visual content may include a stereographic projection, and/or other projections.

In some implementations, the projection point may be located in between the center of the spherical visual content and the pole of the spherical visual content opposite the two-dimensional projection plane based on the field of view being between 90 degrees and 180 degrees.

The projection component may be configured to determine a two-dimensional projection of the spherical visual content. The two-dimensional projection of the spherical visual content may be determined by projecting pixels of the image within the field of view to a two-dimensional projection plane. Individual pixels may be projected along individual projection lines including the projection point and the individual pixel. In some implementations, determining the two-dimensional projection of the spherical visual content may include projecting the pixels of the image within the field of view to the two-dimensional projection plane based on a rotation of the spherical visual content. In some implementations, the projection component may be configured to determine a new two-dimensional projection of the spherical visual content. The new two-dimensional projection of the spherical visual content may be determined by projecting pixels of the image within the new field of view to the two-dimensional projection plane.

The display component may be configured to effectuate presentation of the two-dimensional projection of the spherical visual content on a display. A user may be presented with the two-dimensional projection of the spherical visual content through a graphical user interface of a visual application. In some implementations, the display component may be configured to effectuate presentation of the new two-dimensional projection of the spherical visual content on the display.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates an example of spherical visual content.

FIGS. 4A and 4B illustrates examples of fields of view for spherical visual content.

DETAILED DESCRIPTION

Figure 1:
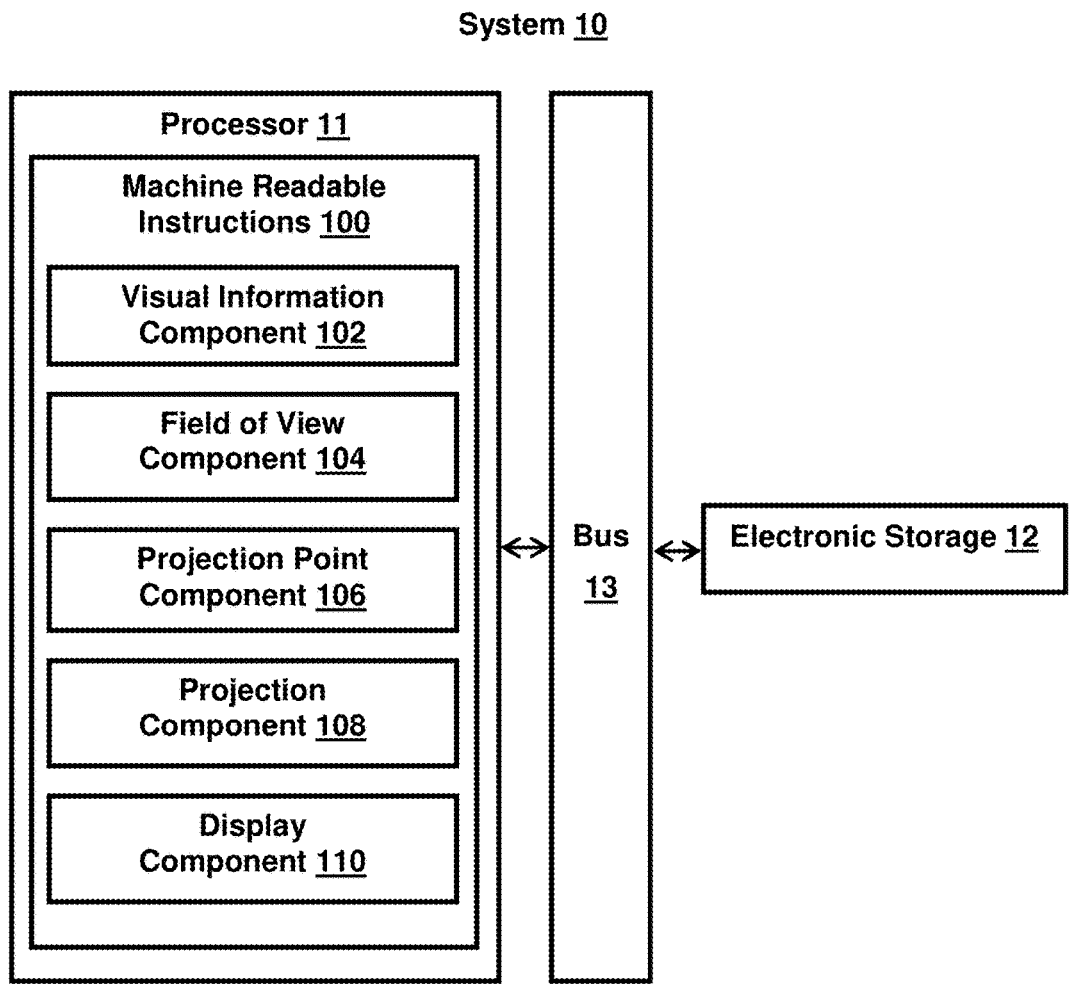
FIG. 1 illustrates a system for providing variable image projection for spherical visual content.

FIG. 1 illustrates system 10 for providing variable image projection for spherical visual content. System 10 may include one or more of processor 11, electronic storage 12, bus 13, and/or other components. Variable image projection for spherical visual content may be provided by obtaining visual information defining an image of the spherical visual content and a field of view for the spherical visual content. A location of a projection point may be determined based on the field of view. A two-dimensional projection of the spherical visual content may be determined by projecting pixels of the image within the field of view to a two-dimensional projection plane. Individuals pixels of the image may be projected along individual projection lines including the projection point and the individual pixel. Presentation of the two-dimensional projection of the spherical visual content may be effectuated.

Electronic storage 12 may include electronic storage media that electronically stores information. Electronic storage 12 may store software algorithms, information determined by processor 11, information received remotely, and/or other information that enables system 10 to function properly. For example, electronic storage 12 may store information relating to spherical visual content, variable image projection, projection point, projection line, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate provision of variable image projection for spherical visual content. Machine readable instructions 100 may include one or more of visual information component 102, field of view component 104, projection point component 106, projection component 108, display component 110, and/or other computer program components.

Visual information component 102 may be configured to obtain visual information defining an image of spherical visual content. An image of spherical visual content may include an array of pixels. Spherical visual content may include visual content obtained by a spherical capture. Visual content may refer to media content that may be observed visually. Visual content may include one or more of an image, a sequence of images, a frame of a video, a video, and/or other visual content. A spherical capture may include 360 degrees or less than 360 degrees capture of visual content at a location. Spherical visual content may be obtained by a spherical capture through use of one or more cameras/image sensors. For example, spherical visual content may be captured by using multiple cameras/image sensors to capture images/video from a location and stitching the images/videos together.

Visual information may define an image of spherical visual content for the whole or a part of the spherical visual content. For example, spherical visual content may be obtained by a spherical capture of 360 degrees and visual information may define an image of the spherical visual content for 360 degrees or less. The amount of spherical visual content defined by the image may correspond to a field of view, discussed below. For example, a field of view for spherical visual content may be 45 degrees and the amount of spherical visual content defined by the image may be 45 degrees.

In some implementations, visual information component 102 may obtain additional visual information defining image(s) for other portions of spherical visual content based on a rotation of the spherical visual content. A rotation of the spherical visual content may correspond to a change in the view of the spherical visual content (e.g., panning the view of the spherical visual content up, down, left, right, etc.). For example, the amount of spherical visual content defined by an initially-obtained image may correspond to a field of view (e.g., 45 degrees, etc.) for an initial spherical visual content rotation (e.g., rotation of 0 degrees, etc.). Based on a rotation of the spherical content downwards by 90 degrees (e.g., shifting the view of the spherical content from looking at the front of the spherical visual content to the top of the spherical visual content, etc.), visual information component 102 may obtain additional visual information defining an image of spherical visual content for the new view of the spherical visual content with the same field of view (e.g., 45 degrees, etc.).

In some implementations, visual information component 102 may obtain visual information defining an image of spherical visual content for an amount greater than the field of view. For example, a field of view for spherical visual content may be 45 degrees and the amount of spherical visual content defined by the image may be 90 degrees. This may allow the spherical visual content to be rotated (e.g., panning the view of the spherical content up, down, left, right, etc.) to view other parts of the spherical visual content without having to obtain additional visual information.

Field of view component 104 may be configured to obtain a field of view for the spherical visual content. The field of view may define an extent of the image to be displayed (e.g., zoom level for an image, etc.). A view of spherical visual content may be defined by a field of view (e.g., zoom level, etc.) and a rotation of the spherical visual content (e.g., panning the view, etc.) about one or more axes (e.g., x-axis, y-axis, z-axis, etc.). For example, FIG. 3 illustrates a non-limiting example of spherical image 30 of spherical visual content. Spherical image 30 may include 360 degrees of visual content capture at a location. Spherical image 30 may include other degrees of visual content capture at a location. FIGS. 4A-4B illustrate non-limiting examples of fields of view for spherical image 30. Field of view 40a in FIG. 4A may be smaller than field of view 40b in FIG. 4B. Field of view 40a and field of view 40b may be centered at the middle of spherical image 30. Spherical image 30 may be rotated so that different portions of spherical image 30 lie within fields of view 40a, 40b. Other sizes of fields of view, other centering of fields of view, and other rotations of spherical visual content are contemplated.

In some implementations, field of view component 104 may obtain a field of view for spherical visual content based on user input. User input may be received through a graphical user interface of a visual application (e.g., a zoom value entered into a zoom field, clicking on zoom-in/zoom-out buttons, moving a zoom slider, etc.), a command entered via a keyboard (e.g., combination of pressing CONTROL button and PLUS/MINUS button, etc.), a command entered via a button on a hardware (e.g., movement of a mouse wheel, clicking on zoom-in/zoom-out buttons, moving a zoom slider on a camera, etc.), pinching in and out on a touch screen, a gesture detected through one or more sensors (e.g., detection of a particular movement of a camera/mobile device, etc.), and/or through other methods. The relationship between the field of view and the user input (e.g., user-indicated zoom level, etc.) may be linear or non-linear. For example, two incremental increase/decrease in the user-indicated zoom level may correspond to same increase/decrease in the field of view. As another example, two incremental increase/decrease in the user-indicated zoom level may correspond to different increase/decrease in the field of view.

In some implementations, field of view component 104 may be configured to determine a new field of view for the spherical visual content. For example, an initial field of view may be determined based on a default or user input, and field of view component 104 may determine a new field of view based on user input. For example, an initial field of view may correspond to field of view 40*a*, and field of view component 104 may determine a change in the field of view to field of view 40*b*.

Projection point component 106 may be configured to determine a location of a projection point based on the field of view. Pixels of spherical visual content may be projected from a projection point onto a two-dimensional projection plane tangent to the spherical visual content. The point at which the two-dimensional projection plane is tangent to the spherical visual content may change based on a rotation of the spherical visual content. A projection point may refer to a point from which a projection line extends. A projection line may extend from a projection point, include an individual pixel to be projected, and end on a point in the two-dimensional projection plane. A projection point may be located on a radius line between a center of spherical visual content and a pole of the spherical visual content opposite the two-dimensional projection plane.

In some implementations, projection point component 106 may be configured to determine a new location of the projection point based on a new field of view. For example, projection point component 106 may determine an initial projection point location for field of view 40*a*. Based on the field of view changing to field of view 40*b*, projection point component 106 may determine a new projection point location for field of view 40*b*.

Figure 5:
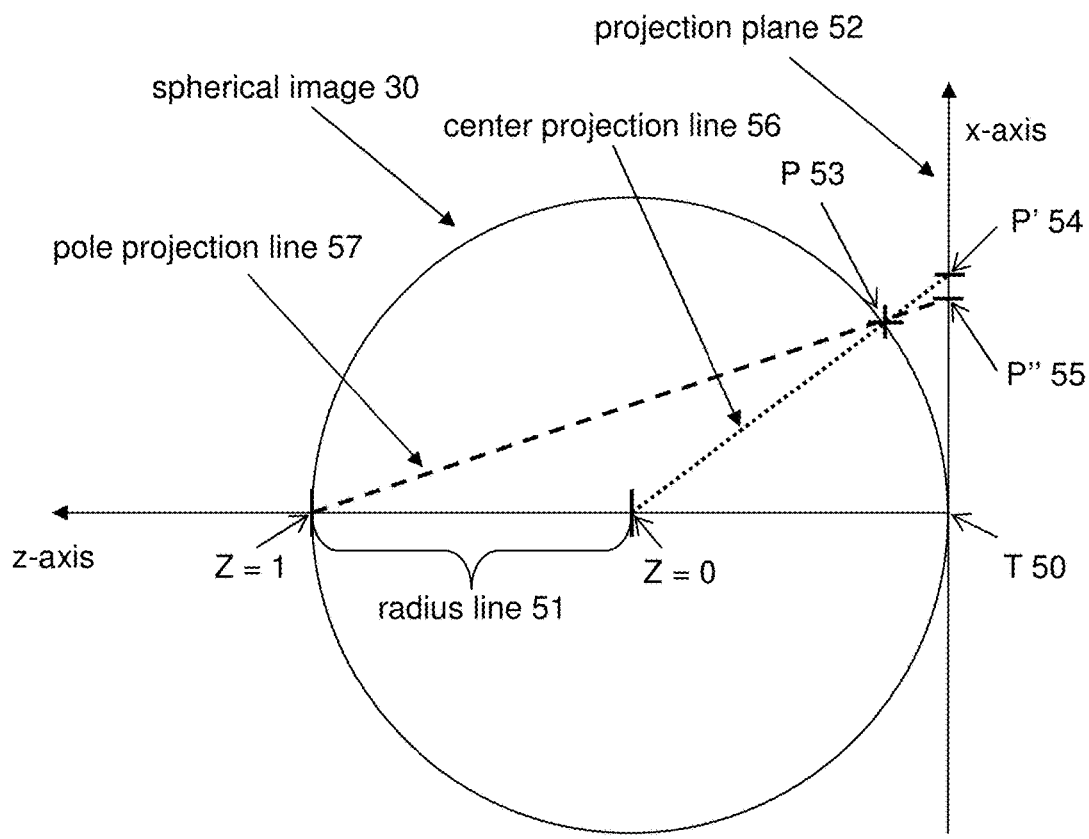
FIG. 5 illustrates a two-dimensional representation of spherical visual content on a plane.

FIG. 5 illustrates a non-limiting example of a two-dimensional representation of spherical image 30 on a X-Z plane. A two-dimensional representation of spherical image 30 on a Y-Z plane may be represented in the same way. Projection plane 52 may lie in a X-Y plane and may be tangent to spherical image 30 at point T 50. Projection point for spherical image 30 may be located on radius line 51 between point Z=0, the center of spherical image 30, and point Z=1, the pole of spherical image 30 opposite projection plane 52.

The field of view for spherical image 30 may determine the projection point for spherical image 30. Narrower fields of view may correspond to the projection point being located closer to or on the center of spherical image 30 and wider fields of view may correspond to the projection point being located closer to or on the pole of spherical image 30 opposite projection plane 52.

The field of view for spherical image 30 may determine the size of projection plane 52. Narrower fields of view may correspond to smaller projection plane 52 and wider fields of view may correspond to larger projection plane 52.

Figure 6:
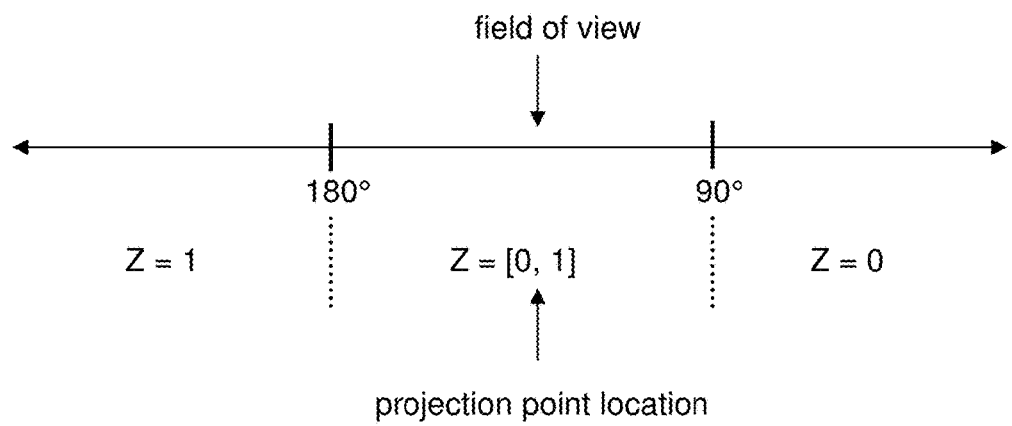
FIG. 6 illustrates projection point locations based on field of view.

FIG. 6 illustrates locations of projection point based on field of view. When the field of view is less than or equal to 90 degrees, the projection point may be located in the center (Z=0) of spherical visual content. When the projection point is located in the center of the spherical visual content, the two-dimensional projection of the spherical visual content may include a gnomonic projection, and/or other projections. In a gnomonic projection, straight lines in the spherical visual content may remain straight in the projection and perspectives in the spherical visual content may be preserved in the projection.

When the field of view is greater than or equal to 180 degrees, the projection point may be located in the pole (Z=1) of spherical visual content opposite the two-dimensional projection plane. When the projection point is located in the pole of the spherical visual content opposite the two-dimensional projection plane, the two-dimensional projection of the spherical visual content may include a stereographic projection, and/or other projections. In a stereographic projection, portions of the spherical visual content may be warped in the projection.

When the field of view is between 90 degrees and 180 degrees, the projection point may be located in between the center (Z=0) of the spherical visual content and the pole (Z=1) of the spherical visual content opposite the two-dimensional projection plane. The relationship between the location of the projection point and the field of view between 90 degrees and 180 degrees may be linear or non-linear. For example, for two incremental shifts of the field of view from 90 degrees to 180 degrees, the location of the projection point may shift left on the radius line by the same amount. As another example, for two incremental shifts of the field of view from 90 degrees to 180 degrees, the location of the projection point may shift left on the radius line by a different amount. When the projection point is located in between the center and the pole of the spherical visual content opposite the two-dimensional projection plane, the amount of warping in the projection may depend on the location of the projection point.

Projection component 108 may be configured to determine a two-dimensional projection of the spherical visual content. The two-dimensional projection of the spherical visual content may be determined by projecting pixels of the image within the field of view from a projection point location to a two-dimensional projection plane. For example, in FIG. 5, projection component 108 may determine a two-dimensional projection of spherical image 30 by projecting pixels of spherical image 30 within a field of view from a projection point location to projection plane 52.

Individual pixels may be projected along individual projection lines including the projection point and the individual pixel. FIG. 5 illustrates two exemplary projection lines for pixel P 53. When the projection point is located at the center (Z=0) of spherical image 30, pixel P 53 may be projected along center projection line 56. Center projection line 56 may include the projection point at the center (Z=0) and pixel P 53. Pixel P 53 may be projected along center projection line 56 to location P' 54 on projection plane 52. When the projection point is located at the pole (Z=1) of spherical image 30 opposite projection plane 52, pixel P 53 may be projected along pole projection line 57. Pole projection line 57 may include the projection point at the pole (Z=1) and pixel P 53. Pixel P 53 may be projected along pole projection line 57 to location P" 55 on projection plane 52.

Figure 7:
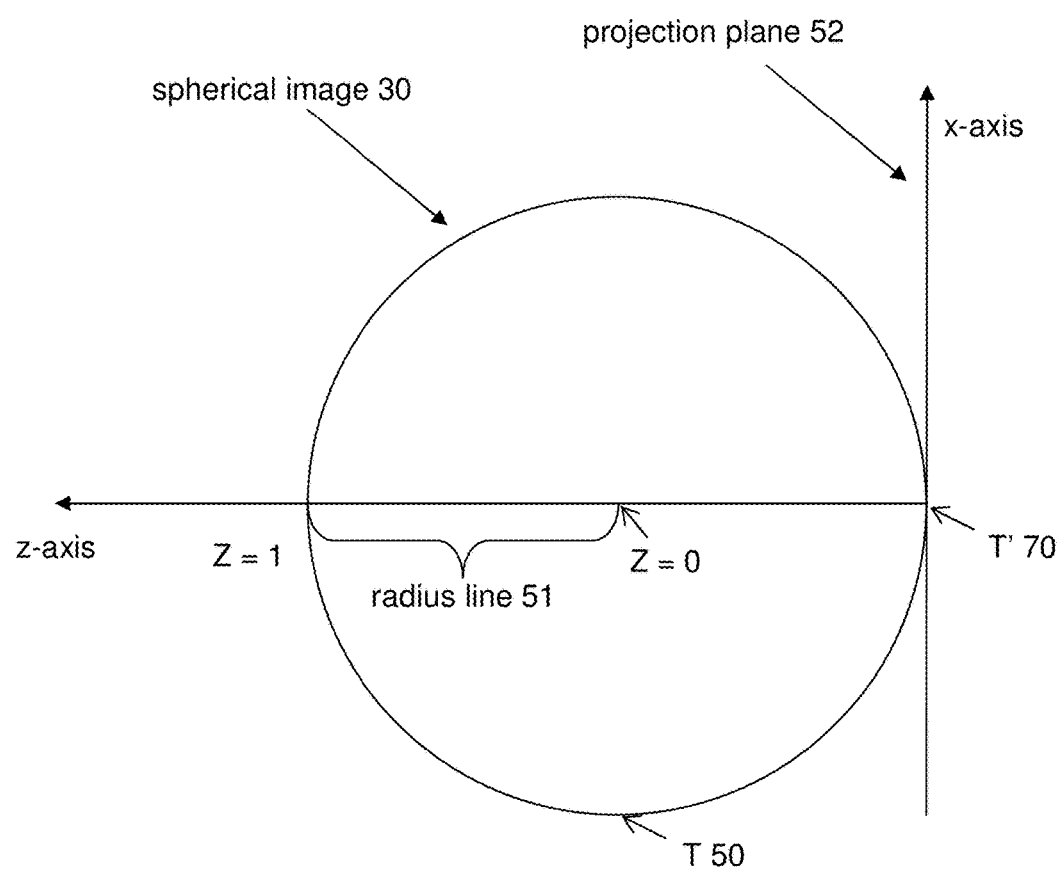
FIG. 7 illustrates an exemplary rotation of spherical visual content.

In some implementations, determining a two-dimensional projection of the spherical visual content may include projecting the pixels of the image within the field of view to the two-dimensional projection plane based on a rotation of the spherical visual content. Projection component 108 may determine a two-dimensional projection of the spherical visual content based on a rotation of the spherical visual content (e.g., a view of spherical visual content, etc.) and/or a change in the rotation of the spherical visual content (e.g., view panning, etc.). For example, projection component 108 may determine a two-dimensional projection of the spherical visual content within a field of view for an initial view centered on point T 50, as shown in FIG. 5 (e.g., a view centered on the equator of the spherical visual content, etc.) using a particular projection point located on radius line 51. The view of the spherical visual content may change from the initial view to a new view centered on point T' 70, as shown in FIG. 7 (e.g., a view centered on the top pole of the spherical visual content, etc.) without a change in the field of view (e.g., the zoom level stays the same in both views, etc.). In FIG. 7, spherical image 30 may have been rotated 90 degrees downwards so that point T 50 (located on the equator of spherical image 30) has been moved to the bottom and projection plane 52 is tangent to point T' 70 (located on the top pole of spherical image 30). Projection component 108 may determine a two-dimensional projection of the spherical visual content within the field of view for the new view using the same particular projection point located on radius line 51. The same particular projection point may be used since the field of view has not changed.

In some implementations, projection component 108 may be configured to determine a new two-dimensional projection of the spherical visual content. The new two-dimensional projection of the spherical visual content may be determined by projecting pixels of the image within a new field of view to a two-dimensional projection plane. For example, projection component 108 may determine an initial two-dimensional projection of spherical visual content for field of view 40a. Based on the field of view changing to field of view 40b, projection component 108 may determine an new two-dimensional projection of the spherical visual content for field of view 40b. The new two-dimensional projection of the spherical visual content for field of view 40b may be determined by projecting pixels of spherical image 30 within field of view 40b to the two-dimensional projection plane.

Display component 110 may be configured to effectuate presentation of the two-dimensional projection of the spherical visual content on a display. A user may be presented with the two-dimensional projection of the spherical visual content through a graphical user interface of a visual application. A visual application may refer to one or more software, one or more software running on one or more hardware, and/or other applications operating to present visual content on a display. As a non-limiting example, a visual application may include one or more of visual content viewer, visual content editor, and/or other visual applications. As a non-limiting example, a visual application may run on one or more of a mobile device, a desktop device, a camera, and/or other hardware.

In some implementations, display component 110 may be configured to effectuate presentation of the new two-dimensional projection of the spherical visual content on the display. For example, display component 110 may effectuate presentation of an initial two-dimensional projection of spherical visual content for field of view 40a. Based on the field of view changing to field of view 40b, display component 110 may effectuate presentation of an new two-dimensional projection of the spherical visual content for field of view 40b.

Figure 8:
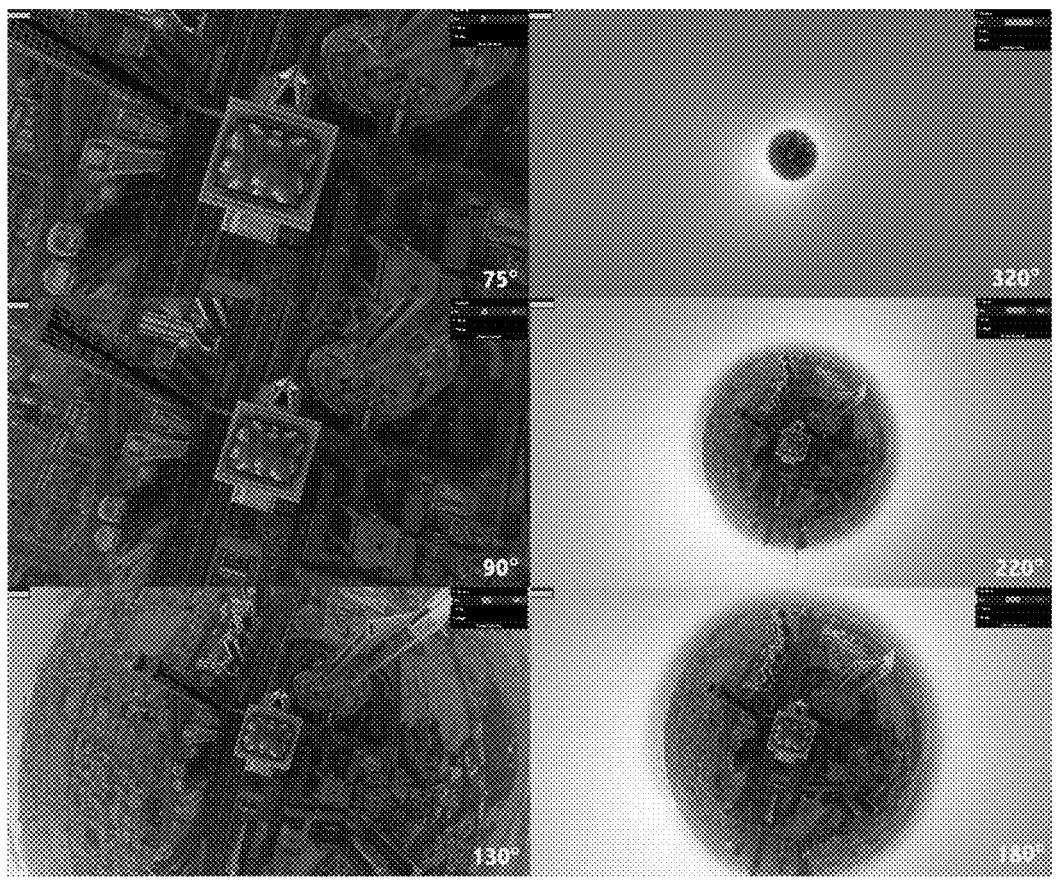
FIG. 8 illustrates examples of two-dimensional projections of spherical visual content at different fields of view.

FIG. 8 illustrates non-limiting examples of two-dimensional projections of spherical visual content at different fields of view. Proceeding counter-clockwise, top-left portion of FIG. 8 illustrates a two-dimensional projection of spherical visual content at a field of view of 75 degrees. The two-dimensional projection of the spherical visual content at a field of view of 75 degrees may be determined by projecting pixels of the spherical visual content from a projection point located in the center (Z=0) of the spherical visual content. In this projection, straight lines in the spherical visual content may remain straight in the projection and perspectives in the spherical visual content may be preserved in the projection.

The middle-left portion of FIG. 8 illustrates a two-dimensional projection of spherical visual content at a field of view of 90 degrees. The two-dimensional projection of the spherical visual content at a field of view of 90 degrees may be determined by projecting pixels of the spherical visual content from a projection point located in the center (Z=0) of the spherical visual content. In this projection, straight lines in the spherical visual content may remain straight in the projection and perspectives in the spherical visual content may be preserved in the projection.

The bottom-left portion of FIG. 8 illustrates a two-dimensional projection of spherical visual content at a field of view of 130 degrees. The two-dimensional projection of the spherical visual content at a field of view of 130 degrees may be determined by projecting pixels of the spherical visual content from a projection point located in between the center (Z=0) and the pole (Z=1) of the spherical visual content. In this projection, the amount of warping of the spherical visual content may depend on the location of the projection point.

The bottom-right portion of FIG. 8 illustrates a two-dimensional projection of spherical visual content at a field of view of 180 degrees. The two-dimensional projection of the spherical visual content at a field of view of 180 degrees may be determined by projecting pixels of the spherical visual content from a projection point located in the pole (Z=1) of the spherical visual content. In this projection, portions of the spherical visual content may be warped.

The middle-right portion of FIG. 8 illustrates a two-dimensional projection of spherical visual content at a field of view of 220 degrees. The two-dimensional projection of the spherical visual content at a field of view of 220 degrees may be determined by projecting pixels of the spherical visual content from a projection point located in the pole (Z=1) of the spherical visual content. In this projection, portions of the spherical visual content may be warped.

The top-right portion of FIG. 8 illustrates a two-dimensional projection of spherical visual content at a field of view of 320 degrees. The two-dimensional projection of the spherical visual content at a field of view of 320 degrees may be determined by projecting pixels of the spherical visual content from a projection point located in the pole (Z=1) of the spherical visual content. In this projection, portions of the spherical visual content may be warped.

Although processor 11 and electronic storage 12 are shown to be connected to a bus 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
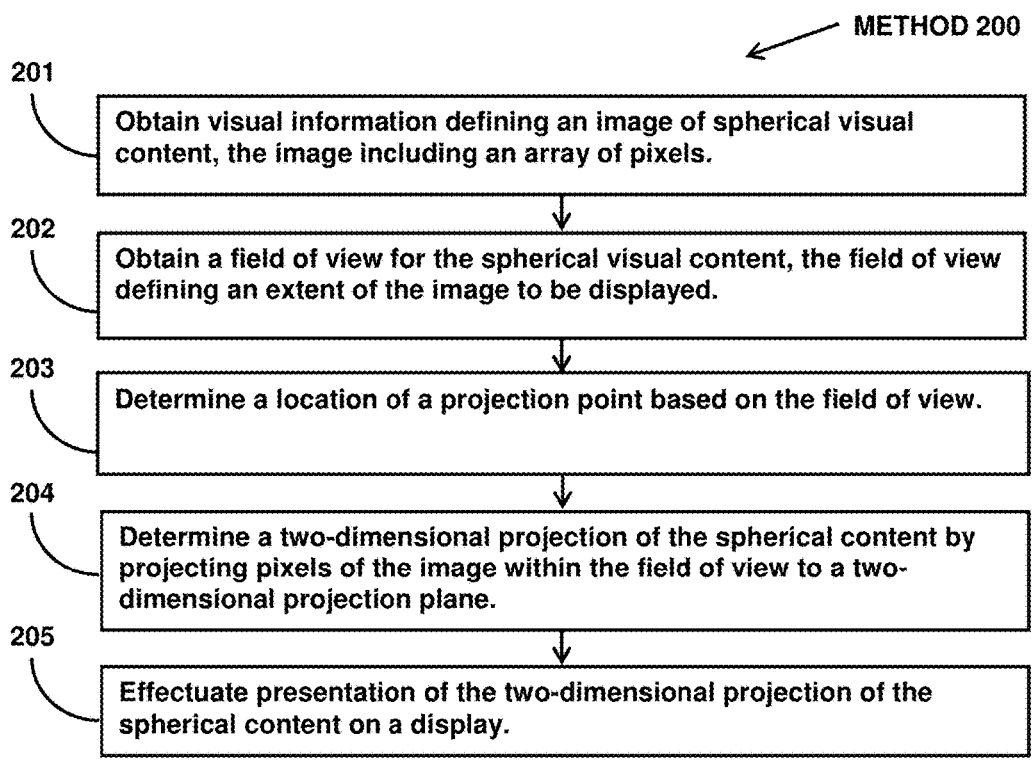
FIG. 2 illustrates a method for providing variable image projection for spherical visual content.

FIG. 2 illustrates method 200 for providing variable image projection for spherical visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, visual information defining an image of spherical visual content may be obtained. The image may include an array of pixels. In some implementations, operation 201 may be performed by a processor component the same as or similar to visual information component 102 (shown in FIG. 1 and described herein).

At operation 202, a field of view for the spherical visual content may be obtained. The field of view may define an extent of the image to be displayed. In some implementations, operation 202 may be performed by a processor component the same as or similar to field of view component 104 (shown in FIG. 1 and described herein).

At operation 203, a location of a projection point may be determined based on the field of view. The projection point may be located on a radius line between a center of the spherical visual content and a pole of the spherical visual content opposite a two-dimensional projection plane. In some implementations, operation 203 may be performed by a processor component the same as or similar to projection point component 106 (shown in FIG. 1 and described herein).

At operation 204, a two-dimensional projection of the spherical visual content may be determined by projecting pixels of the image within the field of view to a two-dimensional projection plane. Individual pixels may be projected along individual projection lines including the projection point and the individual pixel. In some implementations, operation 204 may be performed by a processor component the same as or similar to projection component 108 (shown in FIG. 1 and described herein).

At operation 205, presentation of the two-dimensional projection of the spherical visual content on a display effectuated. A user may be presented with the two-dimensional projection of the spherical visual content through a graphical user interface of a visual application. In some implementations, operation 205 may be performed by a processor component the same as or display component 110 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for providing variable image projection for spherical visual content, the system comprising:
   one or more physical processors configured by machine readable instructions to:
   obtain visual information defining an image of the spherical visual content, the image including an array of pixels;
   obtain a field of view for the spherical visual content, the field of view defining an extent of the image to be displayed;
   determine a location of a projection point based on the field of view;
   determine a two-dimensional projection of the spherical visual content by projecting pixels of the image within the field of view to a two-dimensional projection plane, wherein an individual pixel is projected along an individual projection line including the projection point and the individual pixel; and
   effectuate presentation of the two-dimensional projection of the spherical visual content on a display.

2. The system of claim 1, wherein the projection point is located on a radius line between a center of the spherical visual content and a pole of the spherical visual content opposite the two-dimensional projection plane.

3. The system of claim 2, wherein the projection point is located in the center of the spherical visual content based on the field of view being less than or equal to 90 degrees.

4. The system of claim 3, wherein the two-dimensional projection of the spherical visual content includes a gnomonic projection.

5. The system of claim 2, wherein the projection point is located in the pole of the spherical visual content opposite the two-dimensional projection plane based on the field of view being greater than or equal to 180 degrees.

6. The system of claim 5, wherein the two-dimensional projection of the spherical visual content includes a stereographic projection.

7. The system of claim 2, wherein the projection point is located in between the center of the spherical visual content and the pole of the spherical visual content opposite the two-dimensional projection plane based on the field of view being between 90 degrees and 180 degrees.

8. The system of claim 1, wherein the one or more physical processors are further configured by machine readable instructions to obtain a rotation of the spherical visual content, wherein determining the two-dimensional projection of the spherical visual content includes projecting the pixels of the image within the field of view to the two-dimensional projection plane based on the rotation of the spherical visual content.

9. The system of claim 1, wherein the one or more physical processors are further configured by machine readable instructions to:
   determine a new field of view for the spherical visual content;
   determine a new location of the projection point based on the new field of view;
   determine a new two-dimensional projection of the spherical visual content by projecting pixels of the image within the new field of view to the two-dimensional projection plane; and
   effectuate presentation of the new two-dimensional projection of the spherical visual content on the display.

10. A method for providing variable image projection for spherical visual content, the method comprising:
    obtaining visual information defining an image of the spherical visual content, the image including an array of pixels;
    obtaining a field of view for the spherical visual content, the field of view defining an extent of the image to be displayed;
    determining a location of a projection point based on the field of view;
    determining a two-dimensional projection of the spherical visual content by projecting pixels of the image within the field of view to a two-dimensional projection plane, wherein an individual pixel is projected along an individual projection line including the projection point and the individual pixel; and
    effectuating presentation of the two-dimensional projection of the spherical visual content on a display.

11. The method of claim 10, wherein the projection point is located on a radius line between a center of the spherical visual content and a pole of the spherical visual content opposite the two-dimensional projection plane.

12. The method of claim 11, wherein the projection point is located in the center of the spherical visual content based on the field of view being less than or equal to 90 degrees.

13. The method of claim 12, wherein the two-dimensional projection of the spherical visual content includes a gnomonic projection.

14. The method of claim 11, wherein the projection point is located in the pole of the spherical visual content opposite the two-dimensional projection plane based on the field of view being greater than or equal to 180 degrees.

15. The method of claim 14, wherein the two-dimensional projection of the spherical visual content includes a stereographic projection.

16. The method of claim 11, wherein the projection point is located in between the center of the spherical visual content and the pole of the spherical visual content opposite the two-dimensional projection plane based on the field of view being between 90 degrees and 180 degrees.

17. The method of claim 10, further comprising obtaining a rotation of the spherical visual content, wherein determining the two-dimensional projection of the spherical visual content includes projecting the pixels of the image within the field of view to the two-dimensional projection plane based on the rotation of the spherical visual content.

18. The method of claim 10, further comprising:
    determining a new field of view for the spherical visual content;
    determining a new location of the projection point based on the new field of view;
    determining a new two-dimensional projection of the spherical visual content by projecting pixels of the image within the new field of view to the two-dimensional projection plane; and
    effectuating presentation of the new two-dimensional projection of the spherical visual content on the display.

19. A system for providing variable image projection for spherical visual content, the system comprising:
    one or more physical processors configured by machine readable instructions to:

obtain visual information defining an image of the spherical visual content, the image including an array of pixels;

obtain a field of view for the spherical visual content, the field of view defining an extent of the image to be displayed;

determine a location of a projection point based on the field of view, wherein:
  the projection point is located on a radius line between a center of the spherical visual content and a pole of the spherical visual content opposite the two-dimensional projection plane;
  the projection point is located in the center of the spherical visual content based on the field of view being less than or equal to 90 degrees;
  the projection point is located in between the center of the spherical visual content and the pole of the spherical visual content opposite the two-dimensional projection plane based on the field of view being between 90 degrees and 180 degrees; and
  the projection point is located in the pole of the spherical visual content opposite the two-dimensional projection plane based on the field of view being greater than or equal to 180 degrees;

determine a two-dimensional projection of the spherical visual content by projecting pixels of the image within the field of view to a two-dimensional projection plane, wherein an individual pixel is projected along an individual projection line including the projection point and the individual pixel; and effectuate presentation of the two-dimensional projection of the spherical visual content on a display.

20. The system of claim 19, wherein the one or more physical processors are further configured by machine readable instructions to:

determine a new field of view for the spherical visual content;

determine a new location of the projection point based on the new field of view;

determine a new two-dimensional projection of the spherical visual content by projecting pixels of the image within the new field of view to the two-dimensional projection plane; and effectuate presentation of the new two-dimensional projection of the spherical visual content on the display.

* * * * *